United States Patent
Okisu et al.

(10) Patent No.: US 7,046,289 B2
(45) Date of Patent: May 16, 2006

(54) AUTOMATIC FOCUSING DEVICE, CAMERA, AND AUTOMATIC FOCUSING METHOD

(75) Inventors: Noriyuki Okisu, Osaka (JP); Keiji Tamai, Osaka (JP); Masahiro Kitamura, Osaka (JP); Motohiro Nakanishi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 688 days.

(21) Appl. No.: 10/163,798

(22) Filed: Jun. 5, 2002

(65) Prior Publication Data
US 2002/0191099 A1   Dec. 19, 2002

(30) Foreign Application Priority Data
Jun. 6, 2001   (JP)   ............................. 2001-171154

(51) Int. Cl.
G03B 13/00   (2006.01)
(52) U.S. Cl. .................................................. 348/349
(58) Field of Classification Search .................... None
See application file for complete search history.

(56) References Cited

U.S. PATENT DOCUMENTS

| 4,561,750 A | * | 12/1985 | Matsumura | .................. 396/104 |
| 5,410,383 A | * | 4/1995 | Kusaka et al. | .............. 396/102 |
| 6,933,978 B1 | * | 8/2005 | Suda | .......................... 348/345 |

FOREIGN PATENT DOCUMENTS

| JP | 03-287106 A | 12/1991 |
| JP | 07-318795 A | 12/1995 |

* cited by examiner

*Primary Examiner*—Tuan Ho
*Assistant Examiner*—Adam L. Henderson
(74) *Attorney, Agent, or Firm*—Sidley Austin LLP

(57) ABSTRACT

An automatic focusing device capable of focus detection so that the in-focus state can be adequately realized, even if the magnification changes or a camera shake occurs. The sum total of the absolute values of the differences between two pixels in an evaluation area is calculated, the sum total of the square values of the differences between the two pixels in the evaluation area is calculated, and the evaluation value is obtained based on the sum total of the absolute values of the differences and the sum total of the square values of the differences to obtain the in-focus position of the taking lens.

11 Claims, 9 Drawing Sheets

PIXELS POSITION IN THE
HORIZONTAL DIRECTION

PIXELS POSITION IN THE
HORIZONTAL DIRECTION

AUTOMATIC FOCUSING DEVICE, CAMERA, AND AUTOMATIC FOCUSING METHOD

This application is based on Japanese Patent Application No. 2001-171154 filed in Japan on Jun. 6, 2001, the entire content of which is hereby incorporated by reference.

FIELD OF THE INVENTION

The present invention relates to an automatic focusing technology of receiving an image signal comprising a plurality of pixels, and controlling focusing of the taking lens. More specifically, the present invention relates to an automatic focusing method for realizing the automatic focusing technology, an automatic focusing device using the automatic focusing technology, and a camera using the automatic focusing device.

DESCRIPTION OF RELATED ART

A contrast detecting method (or also called a high climbing method) determining in-focus state based on the image signal obtained through the taking lens and performing automatic focusing control is known as an automatic focusing technology for digital cameras and the like.

In the automatic focusing control according to the conventional contrast detecting method, the taking lens is stepwisely moved in a predetermined direction, an image signal is obtained at each lens position, and an evaluation value (for example, contrast) for evaluating in-focus state is obtained. Then, the lens position where the evaluation value is highest is identified as the in-focus position, and the taking lens is automatically brought into in-focus state.

However, in the automatic focusing control according to the contrast detecting method, when the taking lens is stepwisely moved, there are cases where the magnification of the taking lens changes. In these cases, the position or the area of the subject that is included in the image area for which in-focus state is determined changes. Moreover, it is considered that a camera shake occurs when the taking lens is stepwisely moved and the position or the area of the subject changes. In such a case, when the taking lens is stepwisely moved, the evaluation value abruptly changes at a certain lens position. For this reason, a phenomenon occurs such that the lens position where the evaluation value abruptly changes is erroneously identified as the in-focus position, so that the lens position where the evaluation value is highest cannot be correctly identified.

Japanese Laid-Open Patent Application No. H07-318795 discloses an automatic focusing device in which a high-frequency component of a video signal is detected from the video signal by first detecting means, the high-frequency component and a component of a frequency lower than that of the high-frequency component are detected by second detecting means, and focusing control of an image sensing device is performed based on the quotient when the detection result of the first detecting means is divided by the detection result of the second detecting means.

However, in this prior art, no consideration is given to the change of the magnification of the taking lens, the change of the position or the area of the subject due to a camera shake occurring when the taking lens is stepwisely moved, and the abrupt change of the evaluation value due to the change of the position or the area.

Japanese Laid-Open Patent Application No. H03-287106 discloses an automatic focusing device in which the sum of the squares of the differences between the electric signals obtained from adjoining photoelectrically converting elements is calculated, and the position of the taking lens is moved so that the calculated value is maximum.

However, in this prior art, no consideration is given to the change of the magnification of the taking lens, the change of the position or the area of the subject due to a camera shake occurring when the taking lens is stepwisely moved, and the abrupt change of the evaluation value due to the change of the position or the area.

SUMMARY OF THE INVENTION

Accordingly, the present invention is made in view of the above-mentioned problems, and an object thereof is to provide an automatic focusing device, a camera and an automatic focusing method capable of realizing in-focus state by always identifying the correct in-focus position even when the magnification changes or a camera shake occurs during automatic focusing control.

The above-mentioned object is attained by providing an automatic focusing device, a camera and an automatic focusing method structured as follows:

An automatic focusing device of the present invention is an automatic focusing device receiving an image signal comprising a plurality of pixels, and performing focusing control of a taking lens, and comprises: difference absolute value calculating means for calculating absolute values of differences between pixel data of two pixels in a predetermined positional relationship and included in all or part of an evaluation area of the image signal, and calculating a sum total of the absolute values of the differences obtained for the evaluation area; difference square value calculating means for calculating square values of differences between the pixel data of the two pixels in the evaluation area, and calculating a sum total of the square values of the differences obtained for the evaluation area; evaluation value calculating means for calculating an evaluation value based on the sum total of the absolute values of the differences and the sum total of the square values of the differences; and controlling means for obtaining an in-focus position of the taking lens based on the evaluation value, and driving the taking lens to the in-focus position.

Further, in the automatic focusing device of the present invention, the evaluation value calculating means calculates the evaluation value by dividing the sum total of the square values of the differences by the sum total of the absolute values of the differences.

Further, in the automatic focusing device of the present invention, a plurality of evaluation areas is set for the image signal, the evaluation value is calculated for each of the evaluation areas, and the controlling means obtains the in-focus position by identifying a unitary evaluation value from among a plurality of evaluation values calculated for the evaluation areas.

Further, in the automatic focusing device of the present invention, the pixel data is a luminance value of each pixel obtained from the image signal.

Further, in the automatic focusing device of the present invention, the evaluation areas each comprise a plurality of pixel lines, and the calculations by the difference absolute value calculating means and the difference square value calculating means are performed every predetermined number of pixel lines.

Moreover, a camera of the present invention is a camera taking an image through a taking lens, and comprises: image signal generating means for generating an image signal from the image obtained through the taking lens; difference absolute value calculating means for calculating absolute values of differences between pixel data of two pixels in a predetermined positional relationship and included in all or part of an evaluation area of the image signal, and calculating a sum total of the absolute values of the differences obtained for the evaluation area; difference square value calculating means for calculating square values of differences between the pixel data of the two pixels in the evaluation area, and calculating a sum total of the square values of the differences obtained for the evaluation area; evaluation value calculating means for calculating an evaluation value based on the sum total of the absolute values of the differences and the sum total of the square values of the differences; and controlling means for obtaining an in-focus position of the taking lens based on the evaluation value, and driving the taking lens to the in-focus position.

Further, in the camera of the present invention, the evaluation value calculating means calculates the evaluation value by dividing the sum total of the square values of the differences by the sum total of the absolute values of the differences.

Further, in the camera of the present invention, a plurality of evaluation areas is set for the image signal, the evaluation value is calculated for each of the evaluation areas, and the controlling means obtains the in-focus position by identifying a unitary evaluation value from among a plurality of evaluation values calculated for the evaluation areas.

Further, in the camera of the present invention, the pixel data is a luminance value of each pixel obtained from the image signal.

Further, in the camera of the present invention, the evaluation areas each comprise a plurality of pixel lines, and the calculations by the difference absolute value calculating means and the difference square value calculating means are performed every predetermined number of pixel lines.

Moreover, an automatic focusing method of the present invention is an automatic focusing method receiving an image signal comprising a plurality of pixels, and performing focusing control of a taking lens, and comprises: a step of calculating absolute values of differences between pixel data of two pixels in a predetermined positional relationship and included in all or part of an evaluation area of the image signal, and calculating a sum total of the absolute values of the differences obtained for the evaluation area; a step of calculating square values of differences between the pixel data of the two pixels in the evaluation area, and calculating a sum total of the square values of the differences obtained for the evaluation area; a step of calculating an evaluation value based on the sum total of the absolute values of the differences and the sum total of the square values of the differences; a step of calculating the evaluation value at each lens position by repeating the steps while driving the taking lens; and a step of obtaining an in-focus position of the taking lens based on the evaluation value at each lens position, and driving the taking lens to the in-focus position.

Moreover, an automatic focusing method of the present invention is an automatic focusing device receiving an image signal comprising a plurality of pixels, and performing focusing control of a taking lens, and comprises: first computing value calculating means for calculating a first computing value by use of image data included in the image signal; second computing value calculating means for calculating a second computing value which is a square of the first computing value calculated by the first computing value calculating means; evaluation value calculating means for calculating an evaluation value based on the first computing value and the second computing value calculated by the first computing value calculating means and the second computing value calculating means, respectively; and controlling means for obtaining an in-focus position of the taking lens based on the evaluation value, and driving the taking lens to the in-focus position.

Further, in the automatic focusing method of the present invention, the first computing value calculating means calculates absolute values after calculating difference values between pixel data of two pixels in a predetermined positional relationship and calculates a sum total of the absolute values, and the second computing value calculating means calculates square values of the difference values between the pixel data and calculates a sum total of the square values.

Further, in the automatic focusing method of the present invention, the evaluation value calculating means calculates the evaluation value by dividing the sum total of the square values by the sum total of the absolute values.

Further, in the automatic focusing method of the present invention, a plurality of evaluation areas is set for the image signal, the evaluation value is calculated for each of the evaluation areas, and the controlling means obtains the in-focus position by identifying a unitary evaluation value from among a plurality of evaluation values calculated for the evaluation areas.

Further, in the automatic focusing method of the present invention, the pixel data is a luminance value of each pixel obtained from the image signal.

Further, in the automatic focusing method of the present invention, the evaluation areas each comprise a plurality of pixel lines, and the calculations by the difference absolute value calculating means and the difference square value calculating means are performed every predetermined number of pixel lines.

BRIEF DESCRIPTION OF THE DRAWINGS

These and other objects and features of the present invention will become clear from the following description taken in conjunction with the preferred embodiments thereof with reference to the accompanying drawings, in which:

FIG. 7 is a view showing changes of the evaluation value when there is no change in magnification and the like;

FIG. 11 is a view showing contrast characteristics when there is no change in magnification and the like;

DETAILED DESCRIPTION OF THE PREFERRED EMBODIMENTS

An embodiment of the present invention will be described in detail with reference to the drawings.

<1. Structure of a Digital Camera>

Figure 1:
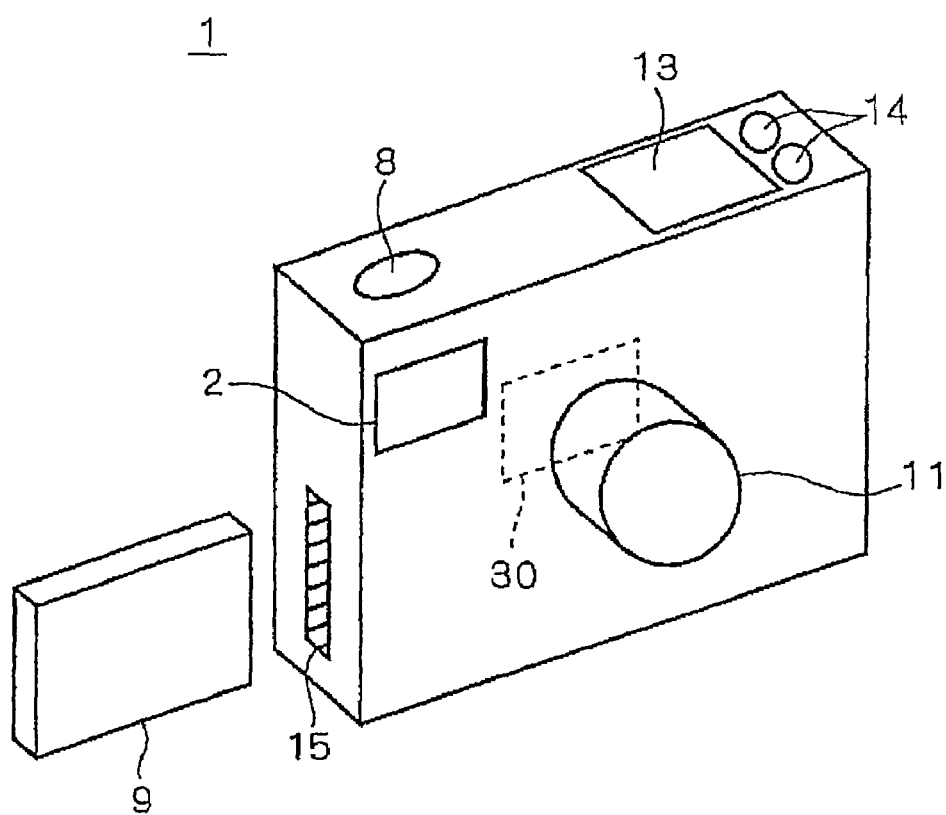
FIG. 1 is a perspective view showing a digital camera according to an embodiment of the present invention.

FIG. 1 is a perspective view showing the digital camera 1 according to the embodiment of the present invention. As shown in FIG. 1, a taking lens 11 and a finder window 2 are provided on the front surface of the digital camera 1. Inside the taking lens 11, a CCD image sensing device 30 is provided as image signal generating means for generating an image signal (signal comprising an array of pixel data of pixels) by photoelectrically converting a subject image incident through the taking lens 11.

The taking lens 11 includes a lens system movable in the direction of the optical axis, and is capable of realizing in-focus state of the subject image formed on the CCD image sensing device 30 by driving the lens system by a CPU described later.

A release button 8, a camera condition display 13 and photographing mode setting keys 14 are disposed on the upper surface of the digital camera 1. The release button 8 is a button which the user depresses when photographing a subject. The camera condition display 13 comprising, for example, a liquid crystal display of a segment display type is provided for indicating the contents of the current setting of the digital camera 1 to the user. The photographing mode setting keys 14 are switches for setting the exposure condition such as aperture priority photographing, shutter speed priority photographing and depth priority photographing, switching the content of the white balance mode setting and selecting the photographing mode suitable for the subject when photographing by the digital camera 1 is performed.

An insertion portion 15 for inserting a recording medium 9 for recording image data is formed on a side surface of the digital camera 1, and the recording medium 9 which is interchangeable can be inserted therein.

Figure 2:
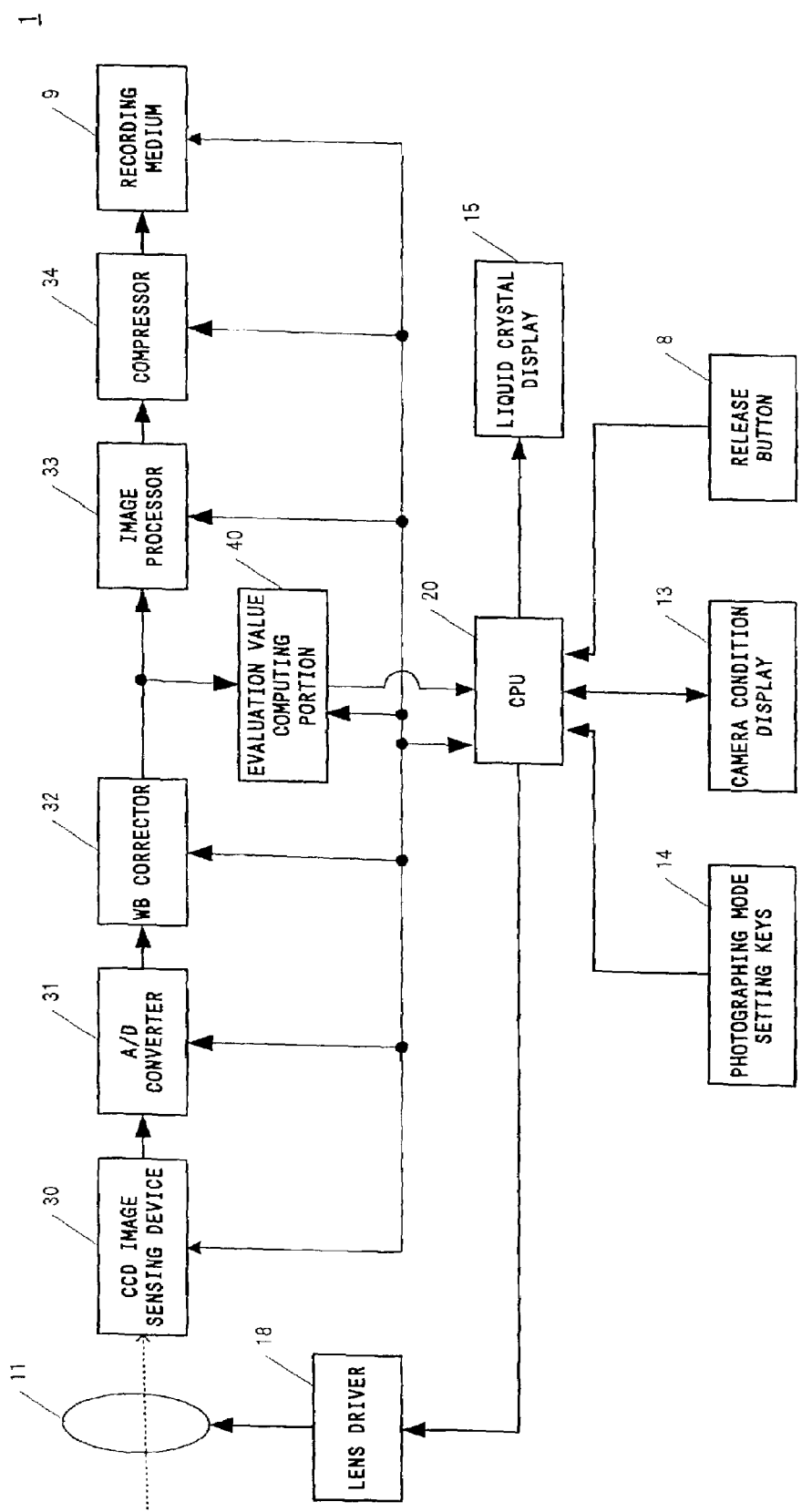
FIG. 2 is a block diagram showing the internal structure of the digital camera.

FIG. 2 is a block diagram showing the internal structure of the digital camera 1. The subject image formed on the CCD image sensing device 30 through the taking lens 11 is converted into an electric image signal at the CCD image sensing device 30, and is recorded onto the recording medium 9 by way of an A/D converter 31, a WB (white balance) corrector 32, an image processor 33 and a compressor 34.

The A/D converter 31 converts the image signal output from the CCD image sensing device 30, for example, into a digital signal of 8 bits per pixel. The WB corrector 32 adjusts the white balance of the image obtained by photographing a subject, based on a preset value of the white balance mode. The image processor 33 performs various kinds of image processings such as gamma correction and color correction. The compressor 34 compresses the image signal received from the image processor 33 by a predetermined compression method.

The image signal output from the WB corrector 32 is supplied to an evaluation value computing portion 40.

The evaluation value computing portion 40 obtains the evaluation value for automatic focusing based on the image signal received from the WB corrector 32. The evaluation value obtained by the evaluation value computing portion 40 is supplied to a CPU 20.

The CPU 20 functions as controlling means for identifying the in-focus position of the taking lens 11 based on the evaluation value obtained from the evaluation value computing portion 40 and driving a lens driver 18 to realize in-focus state of the image formed on the CCD image sensing device 30. When the CPU 20 performs automatic focusing control, a control signal for stepwisely moving the taking lens 11 at very short intervals in the direction of the optical axis is supplied to the lens driver 18.

Then, the CCD image sensing device 30 is caused to perform photographing at each lens position, and the image signal at each lens position is input to the evaluation value computing portion 40 by way of the A/D converter 31 and the WB corrector 32.

The evaluation value computing portion 40 obtains an evaluation value every time the image signal is input, and outputs it to the CPU 20.

Receiving the evaluation value at each lens position obtained by moving the taking lens 11, the CPU 20 identifies the lens position where in-focus state is obtained (in-focus position) based on each evaluation value.

The CPU 20 changes the content of the display on the camera condition display 13 according to the setting content input from the photographing mode setting keys 14, and changes the control condition of each of the elements according to the setting content. When the release button 8 is depressed, the CPU 20 controls each of the elements in response thereto so that photographing for image recording is performed, and causes the image to be recorded onto the recording medium 9.

Further, the CPU 20 displays on a liquid crystal display 15 the images obtained by the CCD image sensing device 30 successively performing photographing. The liquid crystal display 15 is provided on the back surface of the digital camera 1. By the successively taken images being displayed by the CPU 20 as mentioned above, image display as so-called live view images is enabled.

In the digital camera 1 having the above-described structure, automatic focusing control is performed, for example, when the power of the digital camera 1 is on, when a live view image is displayed or when the release button 8 is half-depressed.

<2. Principle of Automatic Focusing>

Figure 3:
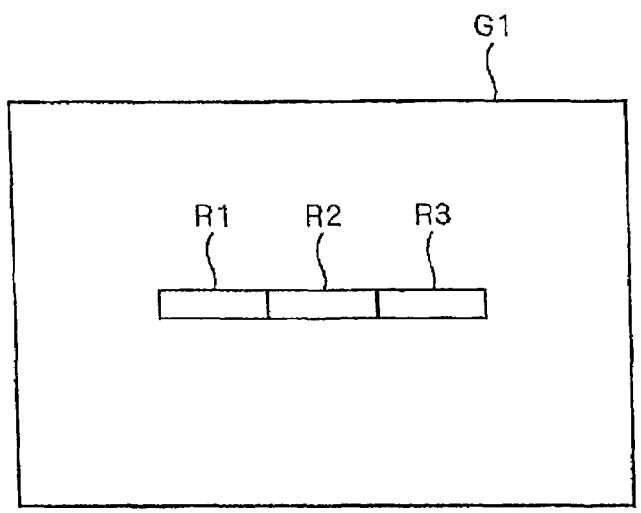
FIG. 3 is a view showing an image based on an image signal.

Next, the principle of automatic focusing control will be described. FIG. 3 is a view showing an image G1 based on an image signal obtained from the CCD image sensing device 30. As shown in FIG. 3, evaluation areas R1, R2 and R3 are set in the image G1 based on the image signal. The evaluation areas R1, R2 and R3 are areas for which the computing for obtaining the evaluation value for automatic focusing is performed. In the present embodiment, a plurality of evaluation areas R1, R2 and R3 is set in a partial area corresponding to a central part of the image G1. For example, when the size of the image G1 is 2000 pixels in the horizontal direction and 1500 pixels in the vertical direction, the size of the evaluation areas R1, R2 and R3 is 250 pixels in the horizontal direction and 100 pixels in the vertical direction. By setting a plurality of evaluation areas R1, R2 and R3 in the image G1 as described above, in-focus state can be determined in a wide range, so that more precise automatic focusing control can be performed.

Then, receiving the image signal, the evaluation value computing portion 40 obtains an evaluation value for each of the evaluation areas R1, R2 and R3. As the evaluation value, it is desirable to use a value representative of a characteristic exhibiting the maximum value in-focus state.

Before an evaluation value computing method characteristic of the present embodiment is described, a general evaluation value computing method will be described.

As a general evaluation value computing expression, for example, the following expression 1 is used:

$$AF1 = \sum_{n=0}^{9} \sum_{m=0}^{245} (Y_{10 \cdot n, m} - Y_{10 \cdot n, m+4})^2 \qquad \text{[Expression 1]}$$

An evaluation value AF1 is obtained for each of the evaluation areas R1, R2 and R3. In the expression 1, n is a parameter for scanning a pixel position in the vertical position, m is a parameter for scanning a pixel position in the horizontal direction, and Y is the luminance value of each pixel. Therefore, by a computing based on the expression 1, the evaluation value AF1 is the sum total, obtained for each of the evaluation areas R1, R2 and R3, of the square values of the differences between the luminance values of target pixels ($Y_{10 \cdot n, m}$) and pixels ($Y_{10 \cdot n, m+4}$) four pixels ahead of the target pixels in the horizontal direction which square values are obtained every ten horizontal lines for each of the evaluation areas R1, R2 and R3.

Figure 4:
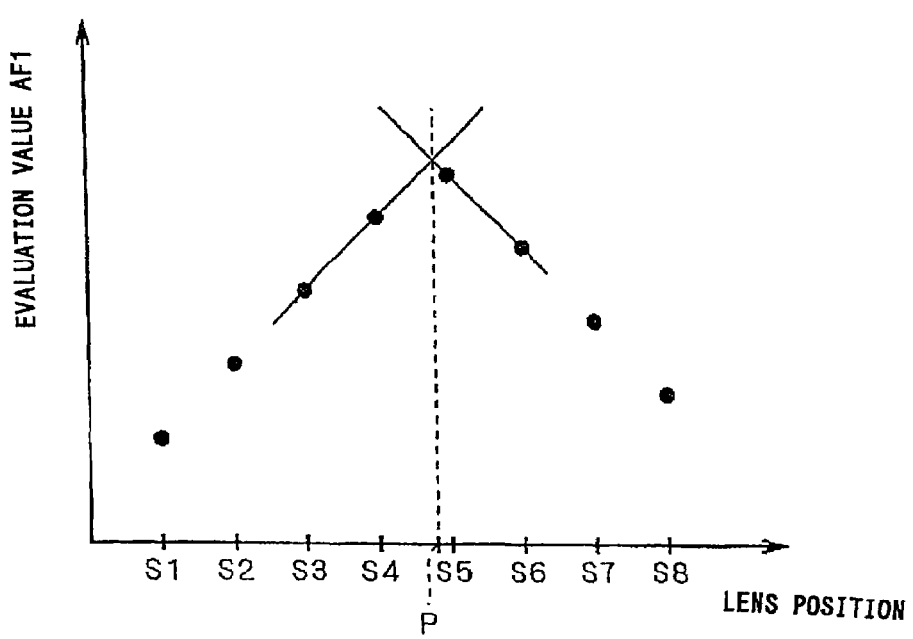
FIG. 4 is a view showing changes of an evaluation value when a taking lens is driven.

FIG. 4 is a view showing changes of the evaluation values AF1 when the taking lens 11 is driven. When the evaluation value AF1 is obtained at each of the lens positions S1, S2, ... while the taking lens 11 is stepwisely driven at regular intervals, the evaluation value AF1 gradually increases to a certain lens position, and thereafter, the evaluation value AF1 gradually decreases. The peak position (maximum point) of the evaluation value AF1 is the in-focus position P of the taking lens 11. In the example of FIG. 4, the in-focus position P is present between the lens positions S4 and S5.

Therefore, the CPU 20 receiving the evaluation value AF1 at each lens position performs predetermined interpolation on the evaluation value AF1 at each lens position to obtain the in-focus position P. As an example of the interpolation, the lens positions S3 and S4 before the peak is reached and the lens positions S5 and S6 after the peak is reached are identified, and a straight line L1 passing through the evaluation values AF1 at the lens positions S3 and S4 and a straight line L2 passing through the evaluation values AF1 at the lens positions S5 and S6 are set. Then, the point of intersection of the straight lines L1 and L2 is identified as the peak point of the evaluation value AF1, and the lens position corresponding thereto is identified as the in-focus position P.

When this processing is performed for each of the evaluation areas R1, R2 and R3, there is a possibility that different in-focus positions are identified among the evaluation areas R1, R2 and R3. Therefore, the CPU 20 finally identifies one in-focus position. For example, the CPU 20 selects, from among the in-focus positions with respect to the evaluation areas R1, R2 and R3, the in-focus position where the subject is determined to be closest to the digital camera 1 (that is, the most near side position), and identifies the position as the final in-focus position.

Then, in-focus state is realized by moving the taking lens 11 to the finally identified in-focus position.

Figure 5:
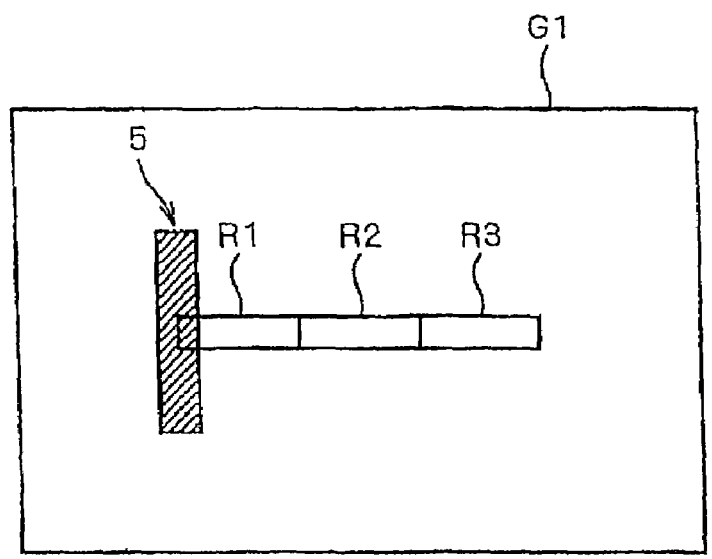
FIG. 5 is a view showing a condition where a subject image is included in an evaluation area.
Figure 6:
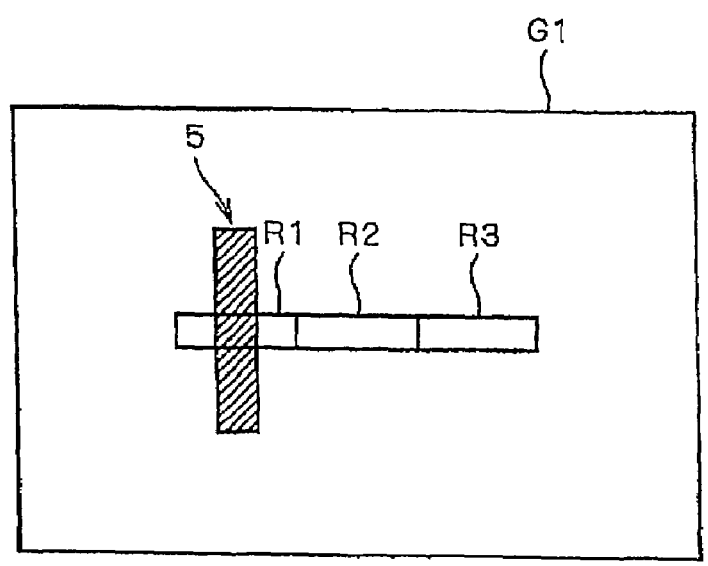
FIG. 6 is a view showing a condition where the subject image is included in the evaluation area in a different condition from that of FIG. 5.

However, there are cases where correct automatic focusing control cannot be performed even if automatic focusing control is performed by evaluating the evaluation value AF1 obtained by the general evaluation value computing method as described above. FIGS. 5 and 6 show conditions where a subject image 5 is taken in different conditions in the evaluation area R1. The width, in the horizontal direction, of the subject image 5 is partly included in the evaluation area R1 in FIG. 5, whereas the width, in the horizontal direction, of the subject image 5 is all included in the evaluation area R1 in FIG. 6. Therefore, one edge of the subject image 5 is included in the evaluation area R1 in the condition of FIG. 5, whereas two edges of the subject image 5 are included in the evaluation area R1 in the condition of FIG. 6.

Assuming now that the condition (the position or the range) of the subject image 5 shown in each of FIGS. 5 and 6 does not change when the taking lens 11 is driven, the evaluation value at each lens position is obtained based on the expression 1. Then, the evaluation value AF1 changes as shown in FIG. 7.

Figure 7:
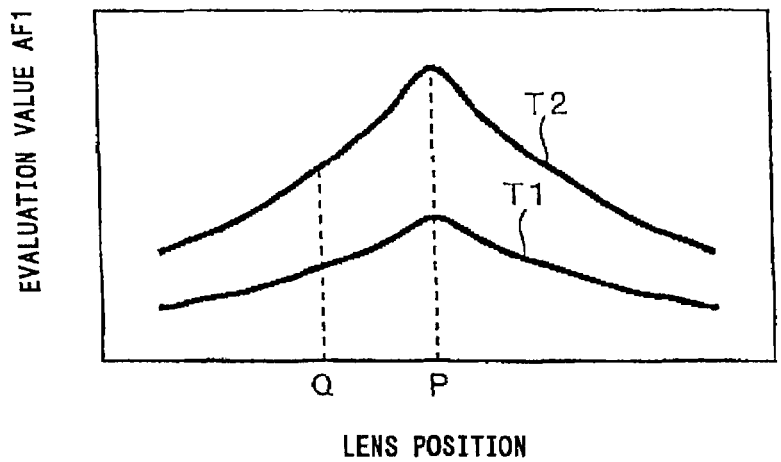

In FIG. 7, an evaluation value characteristic T1 is an evaluation value characteristic in the condition shown in FIG. 5, and an evaluation value characteristic T2 is an evaluation value characteristic in a condition shown in FIG. 6. When it is assumed that the conditions shown in FIGS. 5 and 6 do not change when the taking lens 11 is driven, as shown in FIG. 7, the larger the number of edges of the subject image 5 is, the higher the evaluation value is relatively, and in any case, the in-focus positions P corresponding to the peak points of the evaluation value characteristics T1 and T2 can be adequately identified.

In actuality, however, when the taking lens 11 is stepwisely moved, there are cases where the magnification changes accordingly and the visual field range changes. Moreover, there are cases where when the taking lens 11 is stepwisely moved, a camera shake occurs and the visual field range changes. In such cases, for example, even if the width, in the horizontal direction, of the subject image 5 is all included in the evaluation area R1 as shown in FIG. 6 in the initial stage of driving of the taking lens 11, it is considered that the condition is changed to the one as shown in FIG. 5 where the width, in the horizontal direction, of the subject image 5 is partly included in the evaluation area R1 in a middle stage of driving of the taking lens 11 (for example, at the lens position Q in FIG. 7). Therefore, in the initial stage of driving of the taking lens 11, the evaluation value exhibiting the evaluation value characteristic T2 shown in FIG. 7 shifts to the evaluation value characteristic T1 at the lens position Q.

Figure 8:
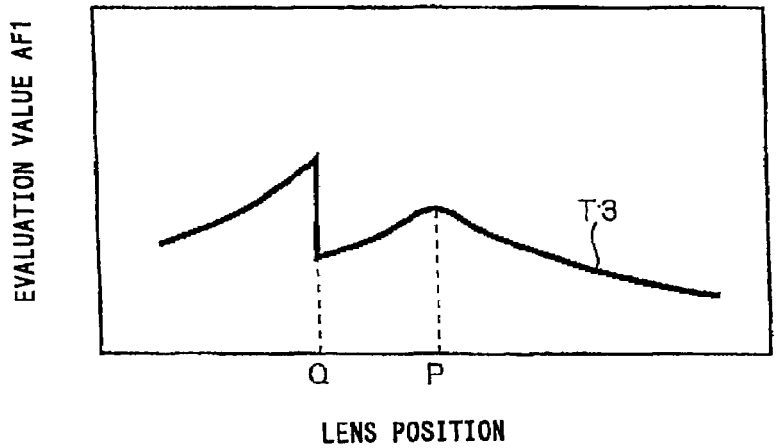
FIG. 8 is a view showing an evaluation value characteristic caused by a change of the condition of position of the subject image.

FIG. 8 is a view showing an evaluation value characteristic T3 caused by the change of the condition of position of the subject image in the evaluation area R1. When the visual field range changes in the middle stage of the lens driving for automatic focusing control, the evaluation value characteristic T3 exhibits the maximum value at the lens position Q as shown in FIG. 8, so that the correct in-focus position P cannot be identified.

Therefore, in the present embodiment, in order that the in-focus position P can be always adequately identified even when a magnification change or a camera shake as described above occurs and the visual field range changes, the evaluation value AF1 obtained by the expression 1 is normalized by the contrast.

The contrast C can be generally obtained by the following expression 2:

$$C = \sum_{n=0}^{9} \sum_{m=0}^{245} |Y_{10 \cdot n, m} - Y_{10 \cdot n, m+4}| \quad \text{[Expression 2]}$$

In the expression 2, n is a parameter for scanning a pixel position in the vertical direction, m is a parameter for scanning a pixel position in the horizontal direction, and Y is the luminance value of each pixel. Therefore, by a computing based on the expression 2, the contrast C is the sum total of the absolute values of the differences between the luminance values of target pixels ($Y_{10 \cdot n, m}$) and pixels ($Y_{10 \cdot n, m+4}$) four pixels ahead of the target pixels in the horizontal direction which absolute values are obtained every ten horizontal lines for each of the evaluation areas R1, R2 and R3.

When the contrast C is obtained based on the expression 2, for example, the contrast C increases as the number of edges of the subject image 5 included in the evaluation areas R1, R2 and R3 increases. On the contrary, when the number of edges is the same, the contrast C exhibits a substantially constant value in in-focus state and out-of-focus state.

Figure 9:
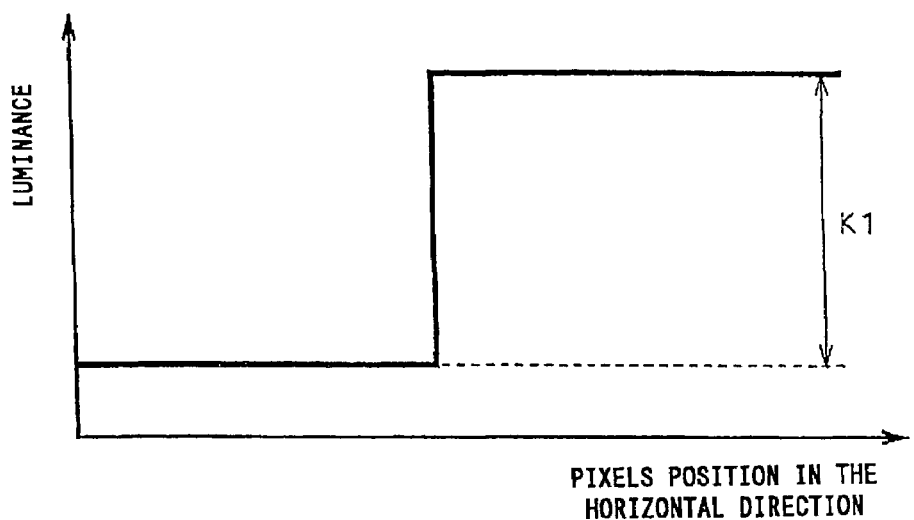
FIG. 9 is a view showing pixels in the horizontal direction and the luminance distribution thereof in-focus state.
Figure 10:
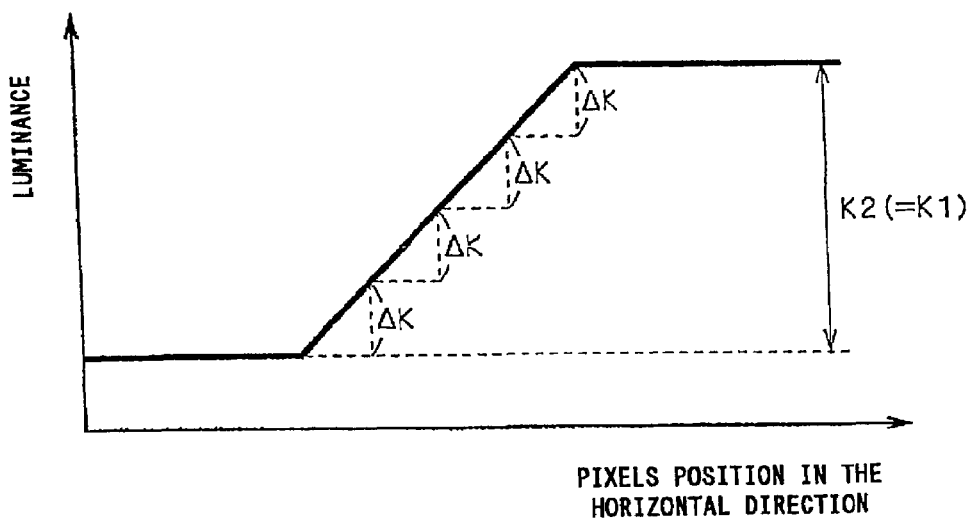
FIG. 10 is a view showing pixels in the horizontal direction and the luminance distribution thereof in out-of-focus state.

FIG. 9 is a view showing pixels in the horizontal direction and the luminance distribution thereof in-focus state. FIG. 10 is a view showing pixels in the horizontal direction and the luminance distribution thereof in out-of-focus state.

When the image is in focus, the luminance distribution is such that the edge of the subject image exhibits a sharp rise as shown in FIG. 9. When the image is out of focus, the luminance distribution is such that the edge of the subject image exhibits a gentle rise as shown in FIG. 10.

Since the luminance differences between pixels adjoining in the horizontal direction are accumulated in the computing based on the expression 2, in the luminance distribution of FIG. 9, the contrast C is finally K1. In the luminance distribution of FIG. 10, the luminance differences ΔK between adjoining pixels are accumulated and the contrast C is finally K2. Since the values K1 and K2 merely represent the difference between the minimum luminance and the maximum luminance of the luminance distribution, a relationship K1=K2 holds. That is, the contrast C obtained by the computing based on the expression 2 exhibits a substantially constant value irrespective of whether the image is in focus or out of focus.

Figure 11:
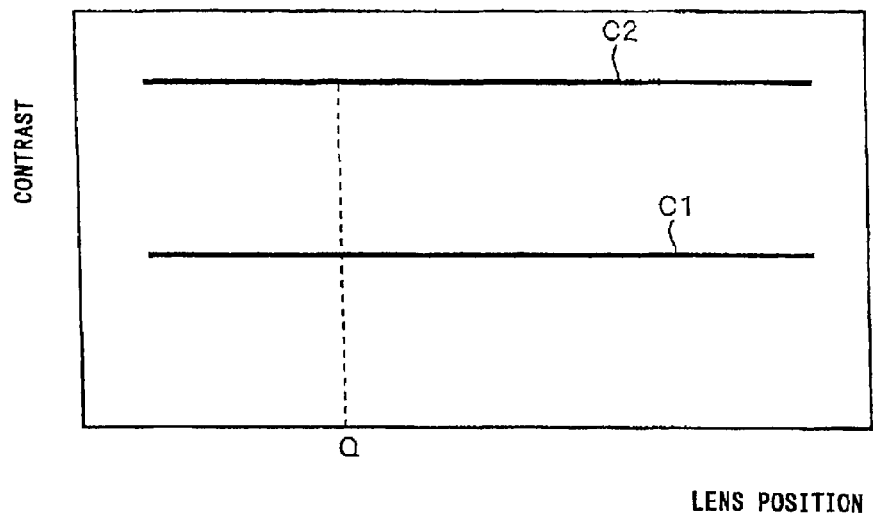

Therefore, when the contrast C is obtained based on, the expression 2 from the image signal obtained from the CCD image sensing device 30 while the taking lens 11 is driven in the conditions of FIGS. 5 and 6, contrast characteristics as shown in FIG. 11 are obtained. In FIG. 11, the contrast characteristic C1 is a contrast characteristic with respect to the evaluation area R1 when the width, in the horizontal direction, of the subject image 5 is partly included in the evaluation area R1 as shown in FIG. 5. The contrast characteristic C2 is a contrast characteristic with respect to the evaluation area R1 when the width, in the horizontal direction, of the subject image 5 is all included in the evaluation area R1 as shown in FIG. 6. The contrast characteristics C1 and C2 exhibit substantially contrast values irrespective of the lens position as mentioned above. Since the number of edges of the subject image 5 included in the evaluation area R1 is smaller in the condition of FIG. 5 than in the condition of FIG. 6, the contrast characteristic C1 is lower than the contrast characteristic C2.

In a case where the visual field range changes when the taking lens 11 is stepwisely moved, the contrast characteristic C2 shown in FIG. 11 is exhibited in the initial stage of driving of the taking lens 11, and the contrast characteristic shifts to C1 at the lens position Q.

Figure 12:
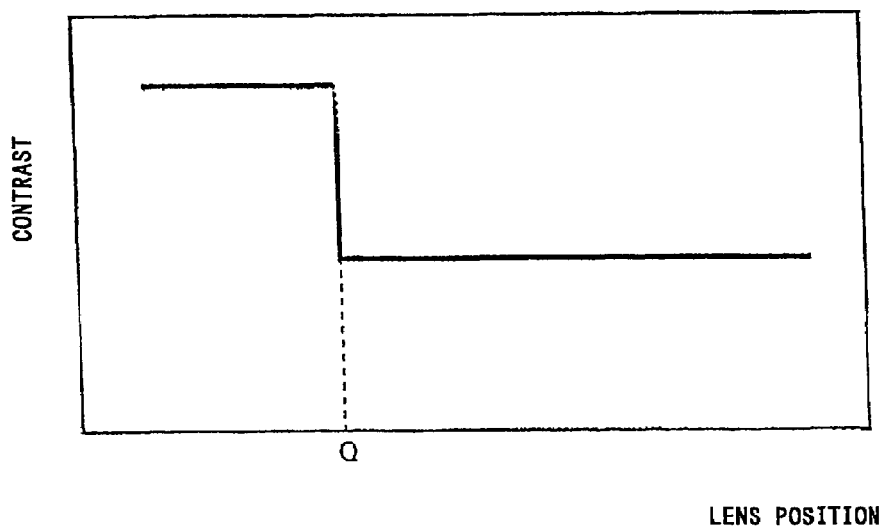
FIG. 12 is a view showing a contrast characteristic caused when a change of the condition of position of the subject image.

FIG. 12 is a view showing a contrast characteristic C3 caused by the change of the condition of position of the subject image in the evaluation area R1. When the visual field range largely changes at the lens position Q in a middle stage of the lens driving for automatic focusing control, the contrast characteristic C3 largely changes at the lens position Q as shown in FIG. 12.

Then, in the present embodiment, the evaluation value AF1 obtained by the expression 1 is normalized by use of the contrast C varying according to the subject image as described above. Specifically, when the evaluation value used for automatic focusing control in the present embodiment is AF2, the evaluation value AF2 is obtained by the following expression 3:

$$AF2 = \frac{AF1}{C} = \frac{\sum_{n=0}^{9} \sum_{m=0}^{245} (Y_{10 \cdot n, m} - Y_{10 \cdot n, m+4})^2}{\sum_{n=0}^{9} \sum_{m=0}^{245} |Y_{10 \cdot n, m} - Y_{10 \cdot n, m+4}|} \quad \text{[Expression 3]}$$

Here, the variables of the expression 3 are the same as those of the expressions 1 and 2.

While the evaluation value AF1 obtained by the expression 1 changes at the lens position Q as described above (see FIG. 8), the contrast C for normalizing the evaluation value AF1 also changes at the lens position Q (see FIG. 12). Therefore, even if the visual field range changes at the lens position Q, the evaluation value AF2 obtained by the expression 3 is not affected by the change.

Figure 13:
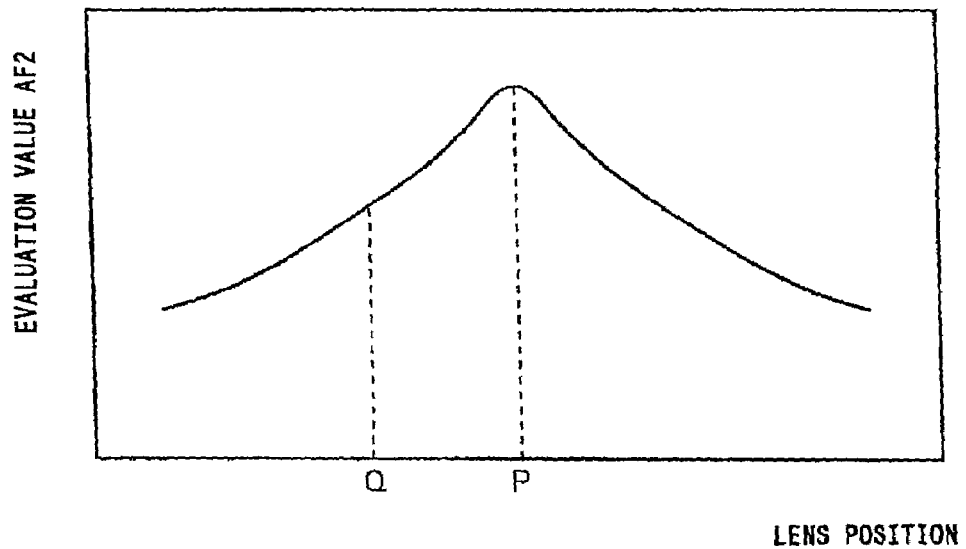
FIG. 13 is a view showing an evaluation value used in the embodiment of the present invention.

FIG. 13 is a view showing the evaluation value used for automatic focusing control in the present embodiment, and shows a relationship between the lens position and the evaluation value AF2 obtained by the expression 3. As shown in FIG. 13, even if the number of edges of the subject image 5 included in the evaluation area R1 changes at the lens position Q when the taking lens 11 is stepwisely moved, the evaluation value AF2 exhibits a characteristic curve not affected by the change, so that the peak point of the evaluation value AF2 can be excellently detected. Consequently, the in-focus position P can be adequately identified.

<3. Detailed Structure of the Evaluation Value Computing Portion>

Next, the detailed structure of the evaluation value computing portion 40 adopting the above-described principle of automatic focusing control will be described.

Figure 14:
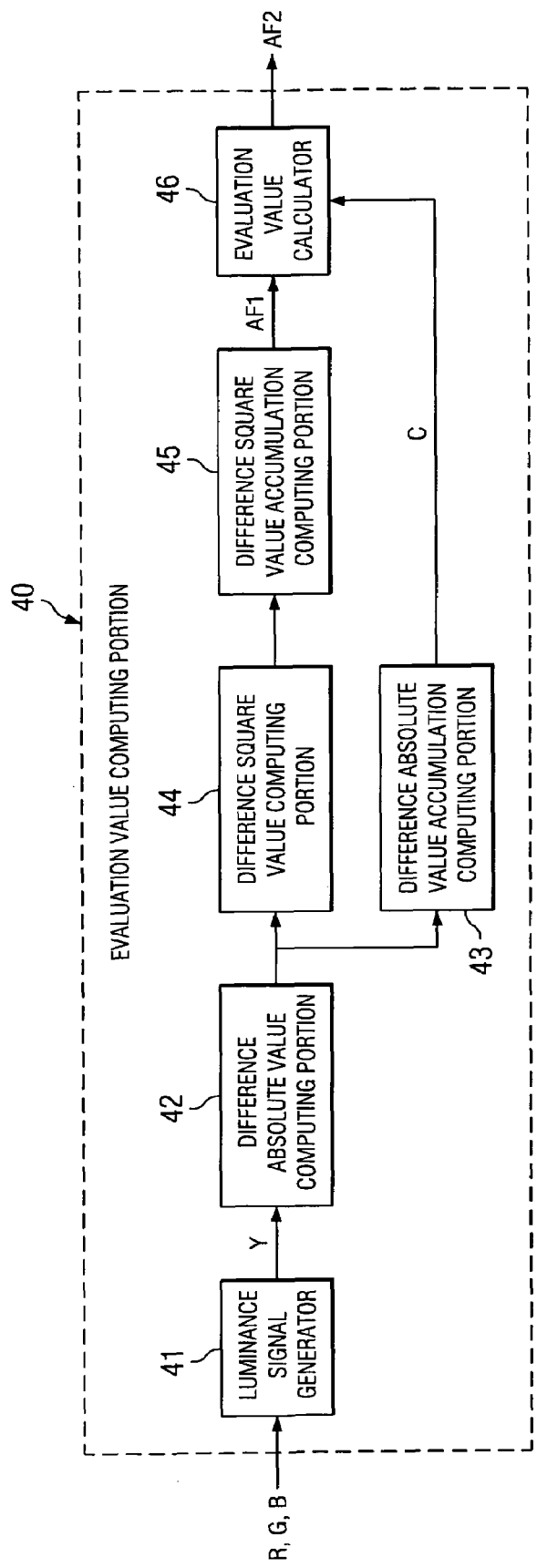
FIG. 14 is a block diagram showing the detailed structure of an evaluation value computing portion.

FIG. 14 is a block diagram showing the detailed structure of the evaluation value computing portion 40 of the digital camera 1. The evaluation value computing portion 40 comprises a luminance signal generator 41, a difference absolute value computing portion 42, a difference absolute value accumulation computing portion 43, a difference square value computing portion 44, a difference square value accumulation computing portion 45, and an evaluation value calculator 46. These elements may be implemented as hardware such as arithmetic circuits, or may be implemented as software by a microprocessor or the like performing a predetermined computing program.

Receiving an image signal comprising color components of R (red), G (green) and B (blue), the luminance signal generator 41 identifies pixels included in the evaluation areas R1, R2 and R3, and generates a luminance signal Y from the color component value corresponding to each pixel. The luminance signal Y is obtained, for example, by performing a weight assignment calculation to multiply each of the color component values of R, G and B by a predetermined coefficient. By performing automatic focusing control based on the luminance value of each pixel, the evaluation value computing in a condition in which the color component values are reflected can be effectively performed. For simplicity, it may be performed to extract the value of a specific color component (for example, a color component value of G) and set the value as the luminance signal Y.

The difference absolute value computing portion 42 receives the luminance signal Y from the luminance signal generator 41, and obtains the absolute value of the difference between the luminance values of a target pixel ($Y_{10 \cdot n, m}$) and a pixel ($Y_{10 \cdot n, m+4}$) four pixels ahead of the target pixel in the horizontal direction. The difference absolute value computing portion 42 successively updates the target pixel, and successively obtains the absolute value of the difference between the luminance values of the target pixel and the pixel four pixels ahead of the target pixel in the horizontal direction.

The difference absolute value accumulation computing portion 43 has a memory for storing the accumulation value of the absolute values of the differences, accumulates the absolute values of the differences successively input from the difference absolute value computing portion 42, and updates the accumulation value in the memory. Consequently, in the difference absolute value accumulation computing portion 43, the contrast C based on the expression 2 is stored in the memory. Then, when the input of the absolute values of the differences from the difference absolute value computing portion 42 is finished, the accumulation value (the sum total of the absolute values of the differences) stored in the memory, that is, the contrast C, is output to the evaluation value calculator 46.

The difference square value computing portion 44 obtains the squares of the absolute values of the differences successively input from the difference absolute value computing portion 42 to obtain the square values of the differences. The square values of the differences are successively output to the difference square value accumulation computing portion 45.

The difference square value accumulation computing portion 45 has a memory for storing the accumulation value of the square values of the differences, accumulates the square values of the differences successively input from the difference square value computing portion 44, and updates the accumulation value in the memory. Consequently, in the difference square value accumulation computing portion 45, the evaluation value AF1 based on the expression 1 is stored in the memory. When the input of the square values of the differences from the difference square value computing portion 44 is finished, the accumulation value (the sum total of the square values of the differences) stored in the memory, that is, the evaluation value AF1, is output to the evaluation value calculator 46.

The evaluation value calculator 46 performs a computing based on the expression 3 to obtain the evaluation value AF2 based on the sum total of the absolute values of the differences and the sum total of the square values of the differences. That is, the evaluation value calculator 46 divides the sum total of the square values of the differences input from the difference square value accumulation computing portion 45, by the sum total of the absolute values of differences input from the difference absolute value accumulation computing portion 43 to thereby obtain the evaluation value AF2 which is the evaluation value AF1 normalized by the contrast C. The evaluation value AF2 obtained by the evaluation value calculator 46 is output to the CPU 20.

The evaluation value computing portion 40 is structured as described above. Every time the taking lens 11 is stepwisely driven and the image signal taken at each lens position is input in automatic focusing control, the above-described processing is performed and the evaluation value AF2 is obtained.

The evaluation value computing portion 40 performs the above-described computing for each of a plurality of evaluation areas R1, R2 and R3 to generate the evaluation value AF2, and outputs the evaluation value AF2 obtained for each of the evaluation areas R1, R2 and R3 to the CPU 20.

When the stepwise driving of the taking lens 11 is finished and the evaluation values AF2 of the evaluation areas R1, R2 and R3 at all the lens positions are input, the CPU 20 evaluates the evaluation value AF2 obtained for each of the evaluation areas R1, R2 and R3, and identifies the in-focus position P in each of the evaluation areas R1, R2 and R3. Then, the CPU 20 selects, for example, the most near side one of the in-focus positions with respect to the evaluation areas R1, R2 and R3, and identifies it as the final in-focus position P. By adopting such an identification method, automatic focusing control suitable for photographing general subjects can be performed. However, the present invention is not limited to identifying the most near side position as the in-focus position, but automatic focusing control suitable for the subject may be realized in accordance with the photographing mode.

Then, a driving signal is supplied to the lens driver 18 so as to drive the taking lens 11 to the identified in-focus position P. Consequently, the taking lens 11 is driven to the in-focus position P, and the in-focus state of the image by the taking lens 11 is realized.

As described above, in the digital camera 1 of the present invention, the absolute values of the differences between the pixel data of two pixels included in an evaluation area set for the image signal are obtained, and the sum total of the absolute values of the differences in the evaluation area is calculated. Then, the square values of the differences between the pixel data of the two pixels in the evaluation area are obtained, and the sum total of the square values of the differences in the evaluation area is calculated. Then, the evaluation value AF2 for automatic focusing is obtained based on the sum total of the absolute values of the differences and the sum total of the square values of the differences to identify the in-focus position P of the taking lens 11, and the taking lens 11 is driven to the in-focus position P.

Consequently, even if the magnification of the taking lens 11 changes or a camera shake occurs during automatic focusing control, the in-focus position P can be always adequately identified, so that the in-focus state of the taking lens 11 can be correctly realized.

Since the sum total of the square values of the differences is divided by the sum total of the absolute values of the differences when the evaluation value AF2 for automatic focusing is obtained, an evaluation value AF2 not affected by a magnification change or a camera shake can be obtained.

Moreover, in the present embodiment, since a plurality of evaluation areas R1, R2 and R3 is set for an image represented by an image signal, in-focus state can be determined in a wide range, so that more precise automatic focusing control can be performed.

Moreover, when the in-focus position P is obtained by identifying a unitary value AF2 from among a plurality of evaluation values AF2 obtained for a plurality of evaluation areas, the taking lens 11 is moved to the in-focus position P where the subject is determined to be closest in the evaluation areas, so that automatic focusing control suitable for photographing general subjects can be performed.

Further, in the present embodiment, since evaluation is performed by use of the luminance value as the pixel data of two pixels, the evaluation value computing in a condition in which each color component value is reflected can be efficiently performed. However, the image signal is not limited to the signal associated with a color image.

<4. Modification>

While an embodiment of the present invention has been described, the present invention is not limited to the embodiment.

For example, while automatic focusing control of the digital camera 1 is described in the above, the above-described automatic focusing control technology is applicable not only to the digital camera 1 but also to film-based cameras. Moreover, an automatic focusing device can be implemented only by the function of the evaluation value computing portion 40 and the function associated with the automatic focusing control of the CPU 20, and the above-described automatic focusing control technology is applicable also to such an automatic focusing device.

Moreover, while an example in which the difference computing is performed between a target pixel and a pixel four pixels ahead of the target pixel is shown in the above, the present invention is not limited thereto. It is necessary only that the difference calculation be performed between two pixels in a predetermined positional relationship.

Moreover, the evaluation area may be the entire area of the image G1 based on the image signal. In that case, however, the evaluation value computing takes time. Therefore, when efficient automatic focusing control is desired, it is desirable to set the evaluation area in a part of a central part of the image G1 based on the image signal as described above. The number of evaluation areas set in the image G1 is not necessarily more than one but may be one.

Further, while a computing example in which the sum total of the square values of the differences is divided by the sum total of the absolute values of the differences to obtain the evaluation value AF2 for automatic focusing is shown in the above, the present invention is not limited thereto. For example, the in-focus position can be adequately identified by dividing the sum total of the absolute values of the differences by the sum total of the square values of the differences. Thus, any computing may be adopted as long as the evaluation value is obtained based on the sum total of the absolute values of the differences and the sum total of the square values of the differences.

As described above, according to the present invention, the sum total of the absolute values of the differences between two pixels in an evaluation area is calculated, the sum total of the square values of the differences between the two pixels in the evaluation area is calculated, and the evaluation value is obtained based on the sum total of the absolute values of the differences and the sum total of the square values of the differences to obtain the in-focus position of the taking lens. Consequently, even if the magnification changes or a camera shake occurs, the in-focus position can be always correctly identified, so that the in-focus state can be adequately realized.

Further, according to the present invention, since the evaluation value is obtained by dividing the sum total of the square values of the differences by the sum total of the absolute values of the differences, an evaluation value not affected by a magnification change or a camera shake can be obtained.

Further, according to the present invention, a plurality of evaluation areas is set, an evaluation value is obtained for each of the evaluation areas, and a unitary evaluation value is identified from among a plurality of evaluation values obtained for the evaluation areas. Consequently, in-focus state can be determined in a wide range, so that more precise automatic focusing control can be performed.

Further, according to the present invention, since the evaluation value is obtained based on the luminance value of each pixel obtained from the image signal, the evaluation value computing can be efficiently performed.

Further, according to the present invention, since the evaluation area comprises a plurality of pixel lines and the calculations by the difference absolute value calculating means and the difference square value calculating means are performed every predetermined number of pixel lines, the evaluation value computing with respect to the evaluation area can be efficiently performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An automatic focusing device receiving an image signal comprising a plurality of pixels, and performing focusing control of a taking lens, comprising:
    difference absolute value calculating means for calculating absolute values of differences between pixel data of two pixels in a predetermined positional relationship and included in all or part of an evaluation area of the image signal, and calculating a sum total of the absolute values of the differences obtained for the evaluation area;
    difference square value calculating means for calculating square values of differences between the pixel data of the two pixels in the evaluation area, and calculating a sum total of the square values of the differences obtained for the evaluation area;
    evaluation value calculating means for calculating an evaluation value based on the sum total of the absolute values of the differences and the sum total of the square values of the differences; and
    controlling means for obtaining an in-focus position of the taking lens based on the evaluation value, and driving the taking lens to the in-focus position.

2. An automatic focusing device as claimed in claim 1, wherein the evaluation value calculating means calculates the evaluation value by dividing the sum total of the square values of the differences by the sum total of the absolute values of the differences.

3. An automatic focusing device as claimed in claim 1, wherein a plurality of evaluation areas is set for the image signal, the evaluation value is calculated for each of the evaluation areas, and the controlling means obtains the in-focus position by identifying a unitary evaluation value from among a plurality of evaluation values calculated for the evaluation areas.

4. An automatic focusing device as claimed in claim 1, wherein the pixel data is a luminance value of each pixel obtained from the image signal.

5. An automatic focusing device as claimed in claim 1, wherein the evaluation areas each comprise a plurality of pixel lines, and the calculations by the difference absolute value calculating means and the difference square value calculating means are performed every predetermined number of pixel lines.

6. A camera taking an image through a taking lens, comprising:
   image signal generating means for generating an image signal from the image obtained through the taking lens;
   difference absolute value calculating means for calculating absolute values of differences between pixel data of two pixels in a predetermined positional relationship and included in all or part of an evaluation area of the image signal, and calculating a sum total of the absolute values of the differences obtained for the evaluation area;
   difference square value calculating means for calculating square values of differences between the pixel data of the two pixels in the evaluation area, and calculating a sum total of the square values of the differences obtained for the evaluation area;
   evaluation value calculating means for calculating an evaluation value based on the sum total of the absolute values of the differences and the sum total of the square values of the differences; and
   controlling means for obtaining an in-focus position of the taking lens based on the evaluation value, and driving the taking lens to the in-focus position.

7. A camera as claimed in claim 6, wherein the evaluation value calculating means calculates the evaluation value by dividing the sum total of the square values of the differences by the sum total of the absolute values of the differences.

8. A camera as claimed in claim 6, wherein a plurality of evaluation areas is set for the image signal, the evaluation value is calculated for each of the evaluation areas, and the controlling means obtains the in-focus position by identifying a unitary evaluation value from among a plurality of evaluation values calculated for the evaluation areas.

9. A camera claimed in claim 6, wherein the pixel data is a brightness value of each pixel obtained from the image signal.

10. A camera as claimed in claim 6, wherein the evaluation areas each comprise a plurality of pixel lines, and the calculations by the difference absolute value calculating means and the difference square value calculating means are performed every predetermined number of pixel lines.

11. An automatic focusing method receiving an image signal comprising a plurality of pixels, and performing focusing control of a taking lens, comprising:
   (a) a step of calculating absolute values of differences between pixel data of two pixels in a predetermined positional relationship and included in all or part of an evaluation area of the image signal, and calculating a sum total of the absolute values of the differences obtained for the evaluation area;
   (b) a step of calculating square values of differences between the pixel data of the two pixels in the evaluation area, and calculating a sum total of the square values of the differences obtained for the evaluation area;
   (c) a step of calculating an evaluation value based on the sum total of the absolute values of the differences and the sum total of the square values of the differences;
   (d) a step of calculating the evaluation value at each lens position by repeating the steps while driving the taking lens; and
   (e) a step of obtaining an in-focus position of the taking lens based on the evaluation value at each lens position, and driving the taking lens to the in-focus position.

* * * * *